US012595335B2

(12) United States Patent
Lee et al.

(10) Patent No.: US 12,595,335 B2
(45) Date of Patent: Apr. 7, 2026

(54) POLYCARBONATE COPOLYMER AND METHOD FOR PREPARING THE SAME

(71) Applicant: LG CHEM, LTD., Seoul (KR)

(72) Inventors: Dayoung Lee, Daejeon (KR); Youngwook Son, Daejeon (KR); Hyong Min Bahn, Daejeon (KR)

(73) Assignee: LG Chem, Ltd., Seoul (KR)

( * ) Notice: Subject to any disclaimer, the term of this patent is extended or adjusted under 35 U.S.C. 154(b) by 400 days.

(21) Appl. No.: 18/039,906

(22) PCT Filed: Jun. 8, 2022

(86) PCT No.: PCT/KR2022/008050

§ 371 (c)(1),
(2) Date: Jun. 1, 2023

(87) PCT Pub. No.: WO2022/260417

PCT Pub. Date: Dec. 15, 2022

(65) Prior Publication Data

US 2024/0018301 A1 Jan. 18, 2024

(30) Foreign Application Priority Data

Jun. 9, 2021 (KR) ........................ 10-2021-0075029

(51) Int. Cl.
*C08G 63/64* (2006.01)
*C08G 63/87* (2006.01)

(52) U.S. Cl.
CPC ............. *C08G 63/64* (2013.01); *C08G 63/87* (2013.01)

(58) Field of Classification Search
None
See application file for complete search history.

(56) References Cited

U.S. PATENT DOCUMENTS 5,077,351 A 12/1991 Matzner et al.
5,159,028 A 10/1992 Matzner et al.
6,613,112 B1 9/2003 Taniguchi
7,649,040 B2 1/2010 Choate, Jr. et al.
2005/0048299 A1 3/2005 Gallucci et al.
2006/0264581 A1 11/2006 Berkstresser et al.
2010/0130770 A1 5/2010 Yiannikouros et al.
2015/0299462 A1* 10/2015 Lee ....................... C08L 51/003 525/185
2019/0219938 A1* 7/2019 Yoshizawa ........... C08G 63/672
2020/0216603 A1 7/2020 Satou et al.
2020/0392331 A1 12/2020 Sybert et al.
2023/0348714 A1* 11/2023 Son ...................... C08G 63/193

FOREIGN PATENT DOCUMENTS

CN 1845959 A 10/2006
JP H04-041524 A 2/1992
JP H10-081737 A 3/1998
JP 2001026636 A * 1/2001
JP 2003207909 A * 7/2003
JP 2004219922 A * 8/2004
JP 2006-052274 A 2/2006
JP 2006078533 A * 3/2006
JP 2007217502 A * 8/2007
JP 4259628 B2 * 4/2009
JP 2011-058336 A 3/2011
JP 2017-082131 A 5/2017
KR 10-1990-0004584 B1 6/1990
KR 10-2008-0009047 A 1/2008
KR 10-2011-0097778 A 8/2011
KR 10-2019-0062046 A 6/2019
KR 10-2020-0080471 A 7/2020
TW 201904934 A 2/2019
WO 90-12053 A1 10/1990
WO 2000-026575 A1 5/2000
WO WO-2015005442 A1 * 1/2015 ........... G03G 5/0696
WO 2017-073508 A1 5/2017
WO WO-2021070741 A1 * 4/2021 .............. C08L 69/00

OTHER PUBLICATIONS

English Machine Translation of JP H1081737 A (Year: 2025).*
English Machine Translation of JP 2004219922 A (Year: 2025).*
English Machine Translation of JP 2006078533 A (Year: 2025).*
Introduction to Plastics Engineering (Year: 2018).*
English Machine Translation of JP 2001026636 A (Year: 2025).*
English Machine Translation of JP 2003207909 A (Year: 2025).*
English Machine Translation of JP 2007217502 A (Year: 2025).*
English Machine Translation of JP 4259628 B2 (Year: 2025).*
English Machine Translation of WO 2015005442 A1 (Year: 2025).*
English Machine Translation of WO 2021070741 A1 (Year: 2025).*
JP 2003207909 A English Machine Translation (Year: 2025).*

* cited by examiner

*Primary Examiner* — Randy P Gulakowski
*Assistant Examiner* — Holley Grace Hester
(74) *Attorney, Agent, or Firm* — Bryan Cave Leighton Paisner LLP

(57) ABSTRACT

Provided is a polycarbonate copolymer having improved surface hardness while maintaining impact strength. The polycarbonate copolymer including a specific ester repeating unit according to the present disclosure is characterized by having excellent surface hardness while maintaining intrinsic basic physical properties of polycarbonate.

10 Claims, No Drawings

POLYCARBONATE COPOLYMER AND METHOD FOR PREPARING THE SAME

CROSS-REFERENCE TO RELATED APPLICATION

The present application is a National Phase entry pursuant to 35 U.S.C. § 371 of International Application No. PCT/KR2022/008050, filed on Jun. 8, 2022, and claims priority to and the benefit of Korean Patent Application No. 10-2021-0075029, filed on Jun. 9, 2021, the disclosures of which are hereby incorporated by reference herein in their entirety.

TECHNICAL FIELD

The present disclosure provides a polycarbonate copolymer having excellent impact strength and surface hardness.

BACKGROUND

Polycarbonate resins are prepared by condensation-polymerization of an aromatic diol such as bisphenol A with a carbonate precursor such as phosgene, and have excellent impact strength, dimensional stability, heat resistance, transparency, etc. Thus, the polycarbonate resins have application in a wide range of uses, such as exterior materials of electrical and electronic products, automobile components, building materials, optical components, etc.

Recently, in order to apply these polycarbonate resins to more various fields, many studies have been made to obtain desired physical properties by copolymerizing two or more aromatic diol compounds having different structures from each other and introducing monomers having different structures into a main chain of the polycarbonate. In particular, as the recent demand for glass replacement plastic increases, it is necessary to study polycarbonate with suitable physical properties for use in interior/exterior materials.

On the other hand, although the existing scratch-resistant polycarbonate has excellent surface hardness, it has limitations in its application as an interior/exterior material due to its low impact strength. Therefore, it is necessary to develop polycarbonate having improved surface hardness while maintaining the intrinsic physical properties of polycarbonate, such as impact resistance at room temperature and transparency.

Accordingly, the present inventors have found that a polycarbonate copolymer satisfies the above conditions, the polycarbonate copolymer prepared by copolymerizing the existing polycarbonate with an ester repeating unit derived from aromatic diol, as described below, thereby completing the present invention.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section

DISCLOSURE

Technical Problem

There are provided a polycarbonate copolymer having excellent surface hardness while maintaining the physical properties of the existing polycarbonate, and a method of preparing the same.

Technical Solution

To solve the above problems, there is provided a polycarbonate copolymer including a repeating unit represented by the following Formula 1; and a repeating unit represented by the following Formula 2.

[Formula 1]

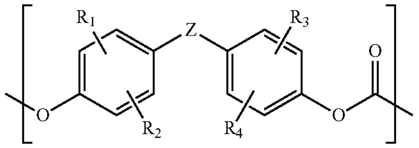

in Formula 1, $R_1$ to $R_4$ are each independently hydrogen, $C_{1-10}$ alkyl, $C_{1-10}$ alkoxy, or halogen, and Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO,

[Formula 2]

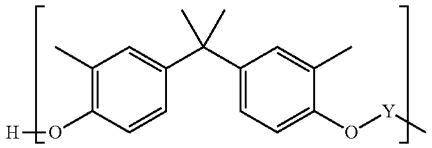

in Formula 2,

Y is a divalent organic group represented by the following Formula 2-1 or 2-2.

[Formula 2-1]

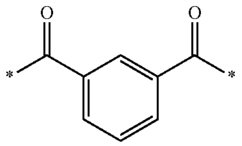

[Formula 2-2]

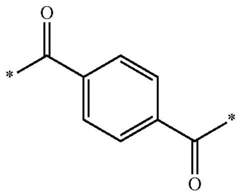

There is also provided a method of preparing the polycarbonate copolymer, the method including the steps of preparing the repeating unit represented by Formula 2 (step 1); and copolymerizing the repeating unit represented by Formula 2 with the repeating unit represented by Formula 1 (step 2).

The polycarbonate is prepared by condensation-polymerization of an aromatic diol compound such as bisphenol A with a carbonate precursor such as phosgene, and have excellent impact strength, dimensional stability, heat resistance, transparency, etc. Thus, the polycarbonate resins have application in a wide range of uses, such as exterior materials of electrical and electronic products, automobile components, building materials, optical components, etc. However, there has been a problem in that the existing scratch-resistant polycarbonate has reduced impact strength.

Accordingly, in the present disclosure, the surface hardness of polycarbonate may be improved while maintaining physical properties of the polycarbonate by including the existing polycarbonate and an ester repeating unit at the same time by introducing the ester repeating unit into the polycarbonate.

Hereinafter, the present disclosure will be described in detail.

Polycarbonate Copolymer

A polycarbonate copolymer according to the present disclosure refers to a polymer in which polycarbonate and an ester repeating unit are copolymerized, and specifically, the polycarbonate copolymer includes the repeating unit represented by Formula 1; and the repeating unit represented by Formula 2.

The polycarbonate is produced by reacting an aromatic diol compound with a carbonate precursor, and specifically, refers to the repeating unit represented by Formula 1.

In Formula 1, preferably, $R_1$ to $R_4$ are each independently, hydrogen, methyl, chloro, or bromo.

Further, preferably, Z is linear or branched $C_{1-10}$ alkylene unsubstituted or substituted with phenyl, and more preferably, methylene, ethane-1,1-diyl, propane-2,2-diyl, butane-2,2-diyl, 1-phenylethane-1,1-diyl, or diphenyl methylene. Further, Z is preferably cyclohexane-1,1-diyl, O, S, SO, $SO_2$, or CO.

Preferably, the repeating unit represented by Formula 1 may be derived from any one or more aromatic diol compounds selected from the group consisting of bis(4-hydroxyphenyl)methane, bis(4-hydroxyphenyl)ether, bis(4-hydroxyphenyl)sulfone, bis(4-hydroxyphenyl)sulfoxide, bis (4-hydroxyphenyl)sulfide, bis(4-hydroxyphenyl)ketone, 1,1-bis(4-hydroxyphenyl)ethane, 2,2-bis(4-hydroxyphenyl) propane (bisphenol A), 2,2-bis(4-hydroxyphenyl)butane, 1,1-bis(4-hydroxyphenyl)cyclohexane (bisphenol Z), 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl) propane, 2,2-bis(4-hydroxy-3-methylphenyl)propane (bisphenol C), 2,2-bis(4-hydroxy-3,5-dimethylphenyl)propane, and 1,1-bis(4-hydroxyphenyl)-1-phenylethane.

The phrase 'derived from aromatic diol compounds' means that a hydroxy group of the aromatic diol compound is reacted with the carbonate precursor to form the repeating unit represented by Formula 1.

For example, when bisphenol A which is an aromatic diol compound is polymerized with triphosgene which is a carbonate precursor, the repeating unit represented by Formula 1 may be represented by the following Formula 1-1:

[Formula 1-1]

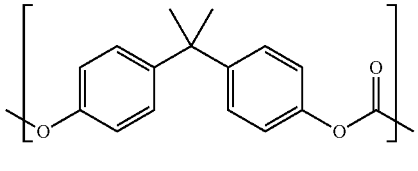

As the carbonate precursor, one or more selected from the group consisting of dimethyl carbonate, diethyl carbonate, dibutyl carbonate, dicyclohexyl carbonate, diphenyl carbonate, ditolyl carbonate, bis(chlorophenyl) carbonate, di-m-cresyl carbonate, dinaphthyl carbonate, bis(diphenyl) carbonate, phosgene, triphosgene, diphosgene, bromophosgene and bishaloformate may be used. Preferably, triphosgene or phosgene may be used.

Further, the polycarbonate copolymer of the present disclosure includes the ester repeating unit represented by Formula 2. In the case of polycarbonate prepared from bisphenol A, its application was limited due to its low surface hardness. Accordingly, the present inventors found that the polycarbonate copolymer including the repeating unit represented by Formula 2 may exhibit improved surface hardness while maintaining excellent intrinsic physical properties of the existing polycarbonate.

The repeating unit represented by Formula 2 is an ester repeating unit prepared by a preparation method described below. In detail, the repeating unit represented by Formula 2 has a structure including an aromatic diol and a phthalate-based compound, in which the phthalate-based compound bound with the aromatic diol is randomly repeated.

Preferably, a weight average molecular weight of the repeating unit represented by Formula 2 is 1,000 g/mol to 30,000 g/mol. More preferably, the weight average molecular weight of the repeating unit represented by Formula 2 is 4,000 g/mol or more, 7,000 g/mol or more, or 10,000 g/mol or more, and 27,000 g/mol or less, 25,000 g/mol or less, or 20,000 g/mol or less. When the weight average molecular weight of the repeating unit represented by Formula 2 is less than 1,000 g/mol, there may be a problem in achieving the physical properties. When it is more than 30,000 g/mol, the molecular weight of polycarbonate may become too high during copolymerization, or a problem may be generated in polymerization.

Preferably, the repeating unit represented by Formula 2 is included in an amount of 5% by weight to 95% by weight, with respect to an amount of the repeating unit represented by Formula 1. More preferably, the repeating unit represented by Formula 2 is included in an amount of 7% by weight or more, 10% by weight or more, 12% by weight or more, or 15% by weight or more, and 90% by weight or less, 85% by weight or less, 80% by weight or less, or 70% by weight or less, with respect to the amount of the repeating unit represented by Formula 1. When the repeating unit represented by Formula 2 is included in the above range, there is an advantage of easily realizing physical properties and copolymerization.

Preferably, a weight average molecular weight of the polycarbonate copolymer is 10,000 g/mol to 100,000 g/mol, and more preferably 15,000 g/mol to 85,000 g/mol. More preferably, the weight average molecular weight is 20,000 g/mol or more, 25,000 g/mol or more, 30,000 g/mol or more, 35,000 g/mol or more, 40,000 g/mol or more, 45,000 g/mol or more, or 50,000 g/mol or more. Further, the weight average molecular weight is 80,000 g/mol or less, 75,000 g/mol or less, or 70,000 g/mol or less.

Preferably, an impact strength at room temperature of the polycarbonate copolymer according to the present disclosure is 500 J/m to 1,000 J/m, as measured at 23° C. in accordance with ASTM D256 (1/8 inch, Notched Izod). More preferably, the impact strength at room temperature is 550 J/m or more, 575 J/m or more, or 600 J/m or more. Further, the impact strength at room temperature is better as the value is higher, and thus there is no upper limit. For example, it may be 990 J/m or less, 980 J/m or less, or 970 J/m or less.

Preferably, a pencil hardness of the polycarbonate copolymer according to the present disclosure is HB or more, as measured in accordance with ASTM D3363.

Method of Preparing Polycarbonate Copolymer

A method of preparing the polycarbonate copolymer according to the present disclosure may include the steps of preparing the repeating unit represented by Formula 2 (step 1); and copolymerizing the repeating unit represented by Formula 2 with the repeating unit represented by Formula 1 (step 2). As described above, the repeating unit represented by Formula 1 refers to polycarbonate.

According to one embodiment of the present disclosure, the step 1 includes the step of polymerizing bisphenol C and compounds represented by the following Formula 3-1 and Formula 3-2:

[Formula 3-1]

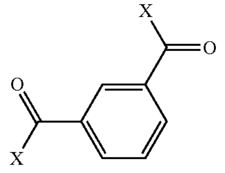

[Formula 3-2]

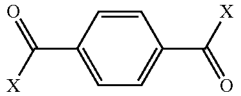

in Formula 3-1 or Formula 3-2,

X is halogen.

More preferably, X is bromo, or chloro.

The method of preparing the repeating unit represented by Formula 2 is the same as in the following Reaction Scheme 1:

[Reaction Scheme 1]

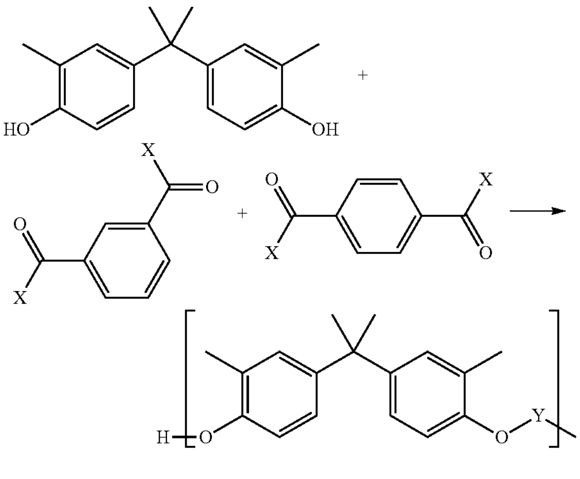

in Reaction Scheme 1, X and Y are the same as defined above.

The repeating unit represented by Formula 2 of the present disclosure is prepared by reacting an aromatic diol compound with two or more kinds of polyfunctional acyl halide compounds, as in Reaction Scheme 1. Specifically, the repeating unit may be prepared through an esterification reaction of aromatic diol with polyfunctional acyl halide. Since two or more kinds of acyl halides are used, it has a structure in which terephthalate units derived from acyl halide are randomly repeated.

Preferably, the compounds represented by Formula 3-1 and Formula 3-2 may be used in an amount of 0.1 equivalent to 1 equivalent, more preferably, in an amount of 0.15 equivalents or more, 0.2 equivalents or more, 0.3 equivalents or more, and 0.95 equivalents or less, 0.9 equivalents or less, or 0.85 equivalents or less with respect to the equivalent of bisphenol C, respectively. When the compounds represented by Formula 3-1 and Formula 3-2 are used in an amount of less than 0.1 equivalent or more than 1 equivalent with respect to the equivalent of bisphenol C, respectively, there is a problem in that oligomers are not formed.

For example, the aromatic diol used in the preparation of the repeating unit represented by Formula 2 may be bisphenol C (BPC), and the polyfunctional acyl halide may be isophthaloyl chloride (IPCl), terephthaloyl chloride (TPCl), or a mixture thereof.

Further, the method of preparing the polycarbonate copolymer according to the present disclosure includes the step of copolymerizing the repeating unit represented by Formula 2 with the repeating unit represented by Formula 1.

The copolymerizing is preferably carried out by interfacial polymerization. During the interfacial polymerization, it is possible to perform the polymerization reaction at normal pressure and at a low temperature, and it is easy to control the molecular weight. In addition, the interfacial polymerization may include, for example, the step of adding a coupling agent after pre-polymerization and then performing polymerization again. In this case, a polycarbonate copolymer having a high molecular weight may be obtained.

Preferably, a polymerization temperature may be 0° C. to 40° C., and a reaction time may be 10 minutes to 5 hours. Further, during the reaction, pH may be preferably maintained at 9 or more, or 11 or more.

As a solvent applicable to the polymerization, the solvent is not particularly limited as long as it is a solvent that is usually used in the polymerization of polycarbonate copolymers. For example, halogenated hydrocarbons such as methylene chloride, chlorobenzene, etc., may be used.

Further, the polymerization may be carried out in the presence of an acid binder. As the acid binder, alkali metal hydroxides such as sodium hydroxide, potassium hydroxide, etc., or amine compounds such as pyridine, etc. may be used.

Further, to control the molecular weight of the polycarbonate copolymer during polymerization, the polymerization may be preferably carried out in the presence of a molecular weight modifier. As the molecular weight modifier, $C_{1-20}$ alkyl phenol may be used. Specific examples thereof may include p-tert-butyl phenol, p-cumyl phenol, decyl phenol, dodecyl phenol, tetradecyl phenol, hexadecyl phenol, octadecyl phenol, eicosyl phenol, docosyl phenol, triacontyl phenol, etc. The molecular weight modifier may be added before the initiation of polymerization, during the initiation of polymerization, or after the initiation of polymerization. The molecular weight modifier may be, for example, included in an amount of 0.01 part by weight or more, 0.1 part by weight or more, or 1 part by weight or more, and 10 parts by weight or less, 6 parts by weight or less, or 5 parts by weight or less, based on 100 parts by weight of the aromatic diol compound. Within the above range, a desired molecular weight may be obtained.

Further, to accelerate the polymerization reaction, a reaction accelerator, for example, a tertiary amine compound, a quaternary ammonium compound, or a quaternary phosphonium compound, such as triethylamine, tetra-n-butylammonium bromide, tetra-n-butylphosphonium bromide, etc., may be further used.

There is also provided an article including the above-described polycarbonate copolymer. As described above, the polycarbonate copolymer according to the present disclosure may include the ester repeating unit to have excellent surface hardness while maintaining impact strength and transparency of the existing polycarbonate, and therefore, it may be applied to a wide range of fields.

Preferably, the article is an injection molded article. In addition, the article may further include, for example, one or more selected from the group consisting of an antioxidant, a heat stabilizer, a photo-stabilizer, a plasticizer, an antistatic agent, a nucleating agent, a lubricant, an impact reinforcing agent, a fluorescent whitening agent, an ultraviolet absorber, a pigment, and a dye.

A method of producing the article may include the steps of mixing the polycarbonate copolymer according to the present disclosure and additives such as an antioxidant, etc. using a mixer, extrusion-molding the mixture using an extruder to prepare pellets, drying the pellets, and injecting the dried pellets using an injection molding machine.

As described above, a polycarbonate copolymer including a specific ester repeating unit according to the present disclosure is characterized by having excellent surface hardness while maintaining basic physical properties of polycarbonate.

DETAILED DESCRIPTION OF THE EMBODIMENTS

Hereinafter, preferred exemplary embodiments will be provided for better understanding of the present disclosure. However, the following exemplary embodiments are provided only for illustrating the present disclosure, but the present disclosure is not limited thereby.

EXAMPLE

Preparation Example 1: Preparation of Ester Repeating Unit (BPCIPTP, 10,000 g/mol)

Bisphenol C (BPC, 23.86 g, 0.093 mol), terephthaloyl chloride (TPCl, 10.5 g, 0.052 mol), and isophthaloyl chloride (IPCl, 10.5 g, 0.052 mol) were dispersed/dissolved in methylene chloride. Then, triethylamine (TEA, 36.66 ml) was slowly added dropwise and stirred at room temperature for 4 hours or longer. Thereafter, the reaction was terminated using 1N HCl, and then the stirred reaction product was washed several times with distilled water using a separatory funnel. Thereafter, the solvent was removed using a rotary vacuum evaporator and dried at 120° C. overnight to obtain a solid. A molecular weight of the obtained ester repeating unit (BPCIPTP) was 10,000 g/mol.

Preparation Example 2: Preparation of Ester Repeating Unit (BPCIPTP, 20,000 g/mol)

An ester repeating unit was prepared in the same manner as in Preparation Example 1, except that 26 g of BPC, 11 g of TPCl, and 11 g of IPCl were used. A molecular weight of the obtained ester repeating unit (BPCIPTP) was 20,000 g/mol.

Comparative Preparation Example 1: Preparation of Ester Repeating Unit (BPAIPTP, 10,000 g/mol)

An ester repeating unit was prepared in the same manner as in Preparation Example 1, except that 23.5 g of BPA was used instead of BPC. A molecular weight of the obtained ester repeating unit (BPAIPTP) was 10,000 g/mol.

Comparative Preparation Example 2: Preparation of Ester Repeating Unit (ResorcinolIPTP, 8,000 g/mol)

ResorcinolIPTP was prepared in the same manner as in the step 1 of Preparation Example 1, except that 11.3 g of Resorcinol was used instead of BPC. A molecular weight of the obtained ester repeating unit (ResorcinolIPTP) was 8,000 g/mol.

Example 1

Water (619.33 g), bisphenol A (BPA, 11.578 g), BPCIPTP (22.5 g, 10,000 g/mol) prepared in Preparation Example 1, a 40 wt % NaOH aqueous solution (102.5 g), and dichloromethane (200 ml) were added to a 2 L main reactor that was equipped with a nitrogen purge device and a condenser, and maintained at room temperature by a circulator, followed by stirring for several minutes.

Nitrogen purging was stopped, triphosgene (62.81 g) and $MeCl_2$ (120 ml) were placed in a 1 L round bottom flask, triphosgene was dissolved therein, and the dissolved triphosgene solution was slowly added to the main reactor. After the addition was completed, 3.04 g of p-tert-butylphenol (PTBP) was added and stirred for 10 minutes. After the stirring was completed, a 40 wt % NaOH aqueous solution (99.8 g) was added, and triethylamine (TEA, 1.5 ml) as a coupling agent was added. At this time, reaction pH was maintained at 11 to 13. After the solution was allowed to stand for a time for sufficient reaction, pH was decreased to 3-4 by addition of HCl to terminate the reaction. Then, stirring was stopped, a polymer layer and an aqueous layer were separated, and the aqueous layer was removed, and pure $H_2O$ was added again, and the washing process was repeated 3 times to 5 times. After the washing was completely carried out, only the polymer layer was extracted, and the polycarbonate copolymer were obtained by re-precipitation using a non-solvent of methanol, $H_2O$, etc.

Examples 2 to 4 and Comparative Examples 1 to 6

Each polycarbonate copolymer was prepared in the same manner as in Example 1, except that the kind and content of the copolymerization repeating unit were used as in Table 1 below.

The content and molecular weight of the copolymerization repeating units used in Examples 1 to 4 and Comparative Examples 1 to 6 are shown in Table 1 below. In Table 1, the content means the content of each repeating unit, based on the total polycarbonate copolymer.

TABLE 1

| | Kind of copolymerization repeating unit | Content of copolymerization repeating unit (%) | Molecular weight of copolymerization repeating unit (g/mol) |
|---|---|---|---|
| Example 1 | BPCIPTP | 15 | 10,000 |
| Example 2 | BPCIPTP | 40 | 10,000 |
| Example 3 | BPCIPTP | 15 | 20,000 |
| Example 4 | BPCIPTP | 40 | 20,000 |
| Comparative Example 1 | — | — | — |
| Comparative Example 2 | BPC | 15 | — |
| Comparative Example 3 | BPC | 40 | — |

TABLE 1-continued

| | Kind of copolymerization repeating unit | Content of copolymerization repeating unit (%) | Molecular weight of copolymerization repeating unit (g/mol) |
|---|---|---|---|
| Comparative Example 4 | BPC | 50 | — |
| Comparative Example 5 | BPAIPTP | 15 | 10,000 |
| Comparative Example 6 | ResorcinolIPTP | 15 | 8,000 |

Experimental Example

Preparation of Specimen 0.050 parts by weight of tris(2,4-di-tert-butylphenyl) phosphite, 0.010 part by weight of octadecyl-3-(3,5-di-tert-butyl-4-hydroxyphenyl)propionate, and 0.030 parts by weight of pentaerythritol tetrastearate were added with respect to 1 part by weight of each polycarbonate copolymer prepared in Examples and Comparative Examples, and pelletized using a Φ30 mm twin-screw extruder equipped with a vent. Injection molding was performed using a N-20C injection molding machine (JSW Co., Ltd.) at a cylinder temperature of 300° C. and a mold temperature of 80° C. to prepare each specimen.

The properties of the specimens were measured by the following methods, and the results are shown in Table 2 below.

(1) Weight Average Molecular Weight 200 mg of the polymer resin was diluted in 200 ml of tetrahydrofuran (THF) solvent to prepare about 1000 ppm of a sample, and its molecular weight was measured through an RI detector at a flow rate of 1 ml/min using an Agilent 1200 series GPC instrument. As a standard for calculating the molecular weight of the sample, 8 kinds of PS standards were used to obtain a calibration curve, and based on this curve, the molecular weight of the sample was determined.

(2) Pencil Hardness

The pencil hardness was measured in accordance with ASTM D 3363. In detail, the angle of the pencil was fixed at 45°, and then the surface of the specimen was scratched by about 6.5 mm to evaluate whether scratches were observed with the naked eye, and the experiment was repeated by changing the hardness of the pencil.

(3) Impact Strength

Impact strength was measured in accordance with ASTM D256 (⅛ inch, Notched Izod) at 23° C.

(4) Transmittance

Transmittance in the range of about 350 nm to about 1050 nm was measured using UltraScan PRO (manufactured by HunterLab) in accordance with ASTM D1003.

TABLE 2

| | Weight average molecular weight (g/mol) | Pencil hardness | Impact strength (J/m) | Transmittance (%) |
|---|---|---|---|---|
| Example 1 | 53,000 | HB | 720 | 89 |
| Example 2 | 53,000 | H | 600 | 88 |
| Example 3 | 53,000 | HB | 750 | 88 |
| Example 4 | 53,000 | H | 620 | 89 |
| Comparative Example 1 | 53,000 | 2B | 700 | 89 |
| Comparative Example 2 | 53,000 | HB | 133 | 88 |
| Comparative Example 3 | 53,000 | F | 120 | 88 |
| Comparative Example 4 | 53,000 | H | 95 | 88 |

TABLE 2-continued

| | Weight average molecular weight (g/mol) | Pencil hardness | Impact strength (J/m) | Transmittance (%) |
|---|---|---|---|---|
| Comparative Example 5 | 53,000 | 2B | 650 | 89 |
| Comparative Example 6 | 53,000 | 2B | 680 | 88 |

As shown in Table 2, it was confirmed that the polycarbonate copolymers according to the present disclosure exhibited excellent pencil hardness while having similar impact strength at room temperature and transmittance, as compared to the existing polycarbonate composition.

The invention claimed is:

1. A polycarbonate copolymer, comprising:

a repeating unit represented by Formula 1; and a repeating unit represented by Formula 2, wherein a weight average molecular weight of the repeating unit represented by Formula 2 is 1,000 g/mol to 30,000 g/mol:

[Formula 1]

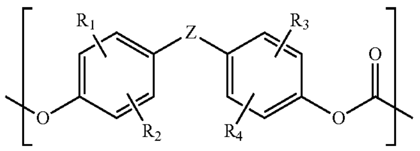

wherein, in Formula 1, $R_1$ to $R_4$ are each independently hydrogen, $C_{1-10}$ alkyl, $C_{1-10}$ alkoxy, or halogen, and Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO,

[Formula 2]

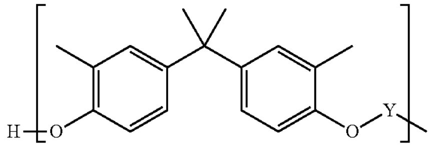

wherein, in Formula 2,

Y is a divalent organic group represented by Formula 2-1 or Formula 2-2

[Formula 2-1]

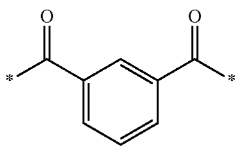

[Formula 2-2]

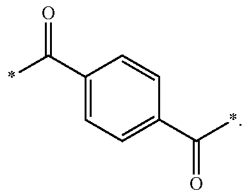

2. The polycarbonate copolymer of claim 1, wherein the repeating unit represented by Formula 1 is derived from any one or more aromatic diol compounds selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, 2,2-bis(4-hydroxyphenyl)propane (bisphenol A), 2,2-bis(4-hydroxyphenyl)butane, 1,1-bis(4-hydroxyphenyl)cyclohexane (bisphenol Z), 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane (bisphenol C), 2,2-bis(4-hydroxy-3,5-dimethylphenyl)propane, and 1,1-bis(4-hydroxyphenyl)-1-phenylethane.

3. The polycarbonate copolymer of claim 1, wherein the repeating unit represented by Formula 1 is represented by the following Formula 1-1:

[Formula 1-1]

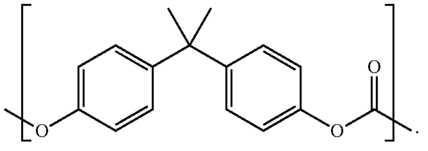

4. The polycarbonate copolymer of claim 1, wherein the repeating unit represented by Formula 2 is included in an amount of 5% by weight to 95% by weight, with respect to an amount of the repeating unit represented by Formula 1.

5. The polycarbonate copolymer of claim 1, wherein a weight average molecular weight of the polycarbonate copolymer is 10,000 g/mol to 100,000 g/mol.

6. The polycarbonate copolymer of claim 1, wherein an Izod impact strength at room temperature of the polycarbonate copolymer is 500 J/m to 1,000 J/m, as measured in accordance with ASTM D256 (1/8 inch, Notched Izod) at 23° C.

7. The polycarbonate copolymer of claim 1, wherein a pencil hardness of the polycarbonate copolymer is HB or more, as measured in accordance with ASTM D3363.

8. A method of preparing a polycarbonate copolymer, the method comprising the steps of:

(1) preparing a repeating unit represented by Formula 2, wherein a weight average molecular weight of the repeating unit represented by Formula 2 is 1,000 g/mol to 30,000 g/mol; and (2) copolymerizing the repeating unit represented by Formula 2 with a repeating unit represented by Formula 1:

[Formula 1]

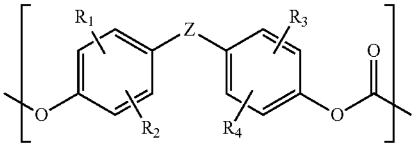

wherein, in Formula 1, $R_1$ to $R_4$ are each independently hydrogen, $C_{1-10}$ alkyl, $C_{1-10}$ alkoxy, or halogen, and Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO,

[Formula 2]

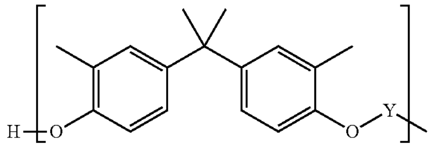

wherein, in Formula 2,

Y is a divalent organic group represented by Formula 2-1 or Formula 2-2

[Formula 2-1]

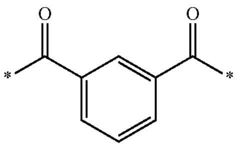

[Formula 2-2]

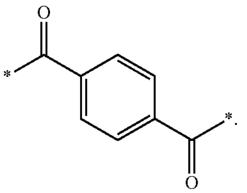

9. The method of claim 8, wherein the step (1) includes a step of polymerizing bisphenol C with compounds represented by Formula 3-1 and Formula 3-2:

[Formula 3-1]

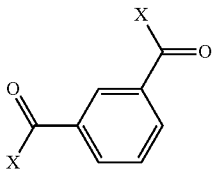

[Formula 3-2]

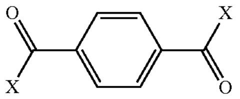

wherein, in Formula 3-1 and Formula 3-2,

X is halogen.

10. The method of claim 9, wherein the compounds represented by Formula 3-1 and Formula 3-2 are used in an amount of 0.1 equivalent to 1 equivalent with respect to the equivalent of bisphenol C, respectively.

* * * * *